United States Patent Office 2,865,426
Patented Dec. 23, 1958

2,865,426

PHOSPHATE-IMPREGNATED INTEGRATED MICA SHEET

Moses D. Heyman, Woodmere, N. Y., assignor to Integrated Mica Corp., Woodmere, N. Y.

No Drawing. Application November 26, 1954
Serial No. 471,530

13 Claims. (Cl. 154—2.6)

This invention relates to a sheet comprising mica flakes and an impregnant occupying the pores among the flakes to provide a material that is strong, substantially non-hygroscopic, capable of withstanding temperatures substantially higher than can be withstood by natural mica, has good dielectric properties, and has resemblance to ceramics in the absence therein of a grain.

It is an object of the present invention to provide a sheet having at least the characteristics above mentioned and also to provide a novel method for producing such a sheet.

In the manufacture of electronic tubes, the different elements of such tubes require support. The best material heretofore available for such support purposes is deemed to be natural mica. However, where a high heat is produced within the tube, and also under conditions where the tube is subject to an extremely high environmental or ambient temperature, as for example, in guided missiles and similar applications where the generated heat is not readily dissipated, water vapors are given off from the mica supports at temperatures approximating 1200° F. or even lower. These vapors come into contact with the heated metallic elements in the tube and cause the same to become dissociated into oxygen and hydrogen. The oxygen combines with the metal elements, which are usually quite thin, causing oxidation of said elements and hastening their burning out with resultant destruction of the tube. Much research has been carried out over a long period of time to find a replacement material for natural mica in such heated environments. An indicated solution of this problem is to use synthetic mica because the same does not contain waters of crystallization and, therefore, cannot release water vapor. It has been suggested by one authority that when synthetic mica is capable of being substituted for natural mica, electronic tubes will have up to five times greater life because of the absence of released vapors. Up to the present time, however, it has not been found possible to commercially sinter synthetic mica to make this material feasible for use in electronic tubes and similar applications. The high cost of fusing or sintering synthetic mica into sheets compares unfavorably with the commercially proved production of integrated mica, the basic sheet of the present product.

Whereas, natural mica is essentially a hydrothermal metamorphosis of feldspar and contains hydroxyl (OH), synthetic mica is produced by fusing potassium silico fluoride with alumina and magnesia. When these ingredients are properly mixed and fused, gradual cooling results in crystallization of the mass and formation of flakes of synthetic mica which differ from natural mica only in that the hydroxyl is replaced by fluoride. Except as noted, synthetic mica is a true mica and reacts in all respects in the same manner as does natural mica. It can be split in the same way that natural mica is split and the splittings or flakes will cohere and form an integrated sheet as taught by me in Pat. Nos. 2,405,576 and 2,659,412.

Ceramics have an important place in the electronics fields. Ordinarily, ceramic materials comprise a highly refractory group that are made from various clays. Practically all of these are used in their oxide form combined with and/or formed into clays that are fired at high temperatures. These ceramics have two major faults that limit their flexibility of use. One, they are substantially inflexible and, two, they are incapable of being made thin without being too fragile for practical purposes. Another fault is that ceramics cannot be formed by inexpensive stamping or shearing methods but can only be molded with the resultant difficulty of achieving accuracy of dimensions.

The present phosphate-impregnated sheet material can be produced as a replacement for ceramics; be made in thicknesses as little as .002"; be capable of being stamped or die-cut with resultant saving of cost and retention of size accuracy; have considerable flexibility; and be able to withstand temperatures as high as 2000° F.

This invention contemplates the provision of a phosphate-impregnated sheet comprising either all natural mica, all synthetic mica, or desired proportions of both types of mica. Since, in most cases, the property of being non-hygroscopic is desired, a base sheet comprising synthetic mica flakes in proportion of three to one of natural mica flakes is preferred but, nevertheless, is exemplary since the proportions may be varied. The less natural mica used, the lower the emission of waters of crystallization under high temperatures.

In practice, integrated mica, made from natural muscovite, phlogopite, biotite, vermiculite, or other mica, or of desired proportions of such natural mica and synthetic mica flakes, is first produced, the same, therefore, comprising thin laminae of mica having activated surfaces and arranged in random fashion whereby portions of said surfaces are in contiguous relation and act on each other to cohere said laminae into an integrated sheet, the remaining portions of the activated surfaces defining a multiplicity of pores among the laminae.

According to the invention, the above sheet is first impregnated with either ethyl silicate or an ordinary silicone resin. If muscovite mica is used, it is possible to impregnate with a solution that contains twenty parts of a solvent, such as xylene, toluene, or similar aromatic solvent, and one part of silicone resin. However, phlogopite micas are less resistant to the action of phosphoric acid, later employed, and the solution requires a higher proportion of the resin, say one part to ten of the aromatic solvent. If ethyl silicate is used instead of silicone resin, the solution preferably comprises one part of ethyl silicate and five parts of a suitable solvent, such as denatured alcohol. The ethyl silicate is a liquid consisting of approximately 85% tetraethyl ortho-silicate and 15% poly-silicate. Thus, depending on whether muscovite or phlogopite mica is used and/or silicone resin or ethyl silicate is used in the solution, the degree of concentration of the solution will vary substantially as above noted.

After the sheet has been impregnated with a solution as above described, the same is allowed to dry and then gradually heated up to a temperature of about 1000° F. in an active atmosphere, i. e., one containing oxygen. Under this heat, the major portion of the organic material that was present in the impregnant is burnt out, leaving a shell of silica in the pores of the integrated mica. The heating time may be regulated to give this burnt-out result. Fifteen to thirty minutes is considered to be exemplary.

At this stage, the sheet is impregnated with ortho-phosphoric acid ($H_3PO_4$). A 75% solution of this acid with either water or denatured alcohol (methanol) may be used, although the degree of dilution of the acid will depend on the type of mica used. The ortho-phosphoric acid solution is now combined with four times its volume of alcohol. This proportion, also, may be varied somewhat. However, this dilution is preferably made with denatured alcohol, rather than with water, because of the better penetrating properties of alcohol and the lower deflocculating action of this volatile liquid. When muscovite mica is used, improved results are obtained by impregnating with a denser solution; that is, three parts of solvent to one part of the acid.

The sheet, preferably suspended, is allowed to dry for about an hour and then is compressed under application of heat. Pressure of about 100 lbs. p. s. i. under temperatures between 550° F. and 600° F. have proven satisfactory in that a strong and firm sheet resulted.

Finally, the sheet is baked in an oven for about one half hour at a temperature approximating 800° F. The resultant sheet is now substantially non-hydroscopic.

In summation of the foregoing, the base sheet may comprise natural or synthetic mica, or desired proportions and combinations of different types of mica, the synthetic mica being preferred in large proportion when the sheet is to be used to produce parts that may be placed in a heated environment under vacuum; this integrated sheet is then impregnated with a five-to-one to a twenty-to-one solution of ethyl silicate or silicone resin, the strength of the solution varying according to whether muscovite or phlogopite mica is used in the proportion of the sheet that is natural mica; after drying, the impregnated sheet is subjected to a gradually applied heat to drive off most of the organic matter and leaving the sheet with a silica shell occupying the pores thereof; again impregnating the sheet, this time, with diluted ortho-phosphoric acid; and, finally, applying heat and pressure to the sheet to render the same strong and firm.

When synthetic and natural micas are used in the proportion of two to three parts of the former to one part of the latter, only about one-quarter or one-third of the flakes comprising the sheet can emit waters of crystallization under high temperatures. Hence, when this sheet, produced as above described, is subjected to a temperature of 1700° F., or even higher, about one-half of the hydroxyl of the natural mica is driven off. This means that but a small portion of the waters of crystallization remain in the sheet—between one-sixteenth and one-eighth of what would be present in natural mica. Since the last-mentioned temperature is higher than the temperatures ordinarily found in an electronic tube or like enclosure, the sheet is heat-treated to at least 1700° F. if the same is to be used where vaporization is not desired.

The sheet and the parts stamped therefrom, as above described, may be further improved, as follows. Before heat-treating as immediately above, parts are stamped or otherwise formed from the sheet after its pressure and baking treatment. These stampings are now again immediately impregnated in a solution of phosphoric acid, but this time, the solution may be materially stronger. One part of acid to three parts of alcohol or approximately such proportion may be used for this re-impregnation. In practice, the stampings are dumped into the solution and removed therefrom after sufficient time for impregnation to be effective. The time may be longer than necessary, since the excess of solution may easily be wiped off. Now, the heat-treating at 1700° F. may be carried out. The strength of the impregnating solution in the re-impregnation step, as immediately above, may be varied according to the strength desired. Also, the pieces being re-impregnated may tend to stick together if the re-impregnating solution is too strong. For the strength required by the supports in electronic tubes, it is sufficient to re-impregnate with an acid solution only about half as strong as that in which the mica was originally dipped. Such re-impregnation provides the desired strength and enables ready separation of the pieces on a foraminous support for easy handling when being placed in a heat-treating oven.

The sheet that is impregnated but once with the phosphoric acid is quite satisfactory for many uses and will withstand temperatures up to 2000° F.—a temperature that no other mica, except synthetic mica, can withstand. As above indicated, if the product is to be used as the supports of the elements of electronic tubes or be used in similar environments, phosphoric acid re-impregnation provides an improved product for the purpose.

The sheet and the parts made therefrom, as above described are flat. However, the phosphate-impregnated sheet, before curing, is quite soft and, therefore, may be formed or molded into other than flat shapes. Hence, products varying considerably in their three-dimensional form may be produced from these softer sheets. Thus, dished items, cups and variety of receptacles may be produced, the same being adapted for use in environments having temperatures as high as 2000° F. Needless to say, the breakage of such utensils, due to both mechanical and thermal shock will be substantially lower than with certain ceramics. These receptacles would have value as vessels in which many acids may be boiled.

While working with the above-described material, I found that the activated surfaces of the flakes comprising integrated mica cause a partial setting or curing of the phosphoric acid at lower temperatures than are ordinarily used to obtain comparable results in other materials. In integrated sheets of phlogotite mica the acid impregnant sets at a temperature as low as 350° F. This indicates that the catalytic effect of the activated surfaces of this type of mica is greater than the effect obtained with muscovite mica since the latter requires approximately twice the temperature, about 600° to 700° F., to obtain the same degree of curing as is obtained in phlogotite mica.

Phosphoric acid ordinarily has a de-flocculating effect on integrated mica. By the method above described, this effect has been so largely overcome that successful production of sheets having the properties herein enumerated has been achieved.

While I have described products at present preferred and also preferred methods for producing the same, said products and methods may be varied within the general broad concepts of the invention. Therefore, I do not desire to restrict myself to the particular forms and steps of product and method disclosed but wish to reserve to myself all modifications of product and method that may fall within the spirit and scope of the appended claims.

I claim:

1. A phosphate-impregnated mica product comprising integrated mica composed of mica flakes cohered into an integrated sheet and having a multiplicity of pores among the flakes, a silica skeletal shell occupying the pores, and cured orthophosphoric acid impregnating the silica shell.

2. A mica product according to claim 1: the flakes comprising both natural and synthetic mica.

3. A mica product according to claim 1: the flakes comprising only synthetic mica.

4. A method for producing a phosphate-impregnated mica product that consists first in integrating mica flakes into a sheet in which there are a multiplicity of pores among the flakes, impregnating said integrated sheet with a solution chosen from the group consisting of ethyl silicate and silicone resin after allowing said impregnated sheet to dry, gradually heating the same up to a temperature that drives off the organic material in the solution to leave a shell of silica in the pores of the sheet, re-impregnating the silica-containing sheet with a solution of ortho-phosphoric acid and a volatile solvent, and, after allowing said re-impregnated sheet to dry, subjecting the same to both heat and pressure.

5. A method according to claim 4: the heat applied gradually after impregnation with the silica-containing solution approximating a high of 1000° F.

6. A method according to claim 4: the applied heat after impregnation with the silica-containing solution being applied for approximately between fifteen and thirty minutes and at a high of about 1000° F.

7. A method according to claim 4: the heat and pressure after re-impregnation being, respectively, 550° to 600° F. and one hundred pounds per square inch.

8. A method for producing a phosphate-impregnated mica sheet that consists in first integrating mica flakes into a sheet in which there are a multiplicity of pores among the flakes, impregnating said integrated sheet with a solution chosen from the group consisting of ethyl silicate and silicone resin after allowing said integrated sheet to dry, gradually heating the same up to a temperature that drives off the organic material in the solution to leave a shell of silica in the pores of the sheet, re-impregnating the silica-containing sheet with a solution of ortho-phosphoric acid and a volatile solvent, and, after allowing said re-impregnated sheet to dry, subjecting the sheet to both heat and pressure followed by baking at a temperature approximately 800° F.

9. A method according to claim 8: after said baking step heat-treating the sheet to at least 1700° F. to largely eliminate the waters of crystallization present in the flakes.

10. A method according to claim 8: stamping portions from said baked sheet, again impregnating the stamped portions with a phosphoric acid solution, and, finally, heat-treating the stamped portions to at least 1700° F. to largely eliminate the waters of crystallization present in the flakes.

11. A method for producing a phosphate-impregnated mica product that consists first in integrating mica flakes into a sheet in which there are a multiplicity of pores among the flakes, impregnating said integrated sheet with a solution chosen from the group consisting of ethyl silicate and silicone resin after allowing said impregnated sheet to dry, gradually heating the same up to a temperature that drives off the organic material in the solution to leave a shell of silica in the pores of the sheet, re-impregnating the silica-containing sheet with a solution of ortho-phosphoric acid and a volatile solvent to produce a soft and moldable sheet, changing the form of said soft sheet, as desired, and subjecting the sheet thus form-changed to both heat and pressure.

12. A mica product comprising integrated mica, silica occupying the pores of said integrated mica, and a phosphoric impregnant in the silica and comprising the vaporized residue of ortho-phosphoric acid.

13. A mica product according to claim 12: the integrated mica comprising flakes from which the waters of crystallization have been largely removed.

References Cited in the file of this patent

UNITED STATES PATENTS

| | | |
|---|---|---|
| 2,084,263 | Broughton | June 15, 1937 |
| 2,108,577 | Brough | Feb. 15, 1938 |
| 2,196,974 | Broughton | Apr. 16, 1940 |
| 2,258,218 | Rochow | Oct. 7, 1941 |
| 2,405,576 | Heyman | Aug. 13, 1946 |
| 2,439,667 | Mathes | Apr. 13, 1948 |
| 2,456,251 | Boughton et al. | Dec. 14, 1948 |
| 2,549,880 | Bardet | Apr. 24, 1951 |
| 2,595,728 | Swiss | May 6, 1952 |
| 2,644,781 | Smolak | July 7, 1953 |